United States Patent [19]
Sato

[11] 4,321,638
[45] Mar. 23, 1982

[54] SUPERMINIATURE CASSETTE TAPE RECORDER

[75] Inventor: Masaaki Sato, Hachioji, Japan

[73] Assignee: Olympus Optical Company Limited, Hachioji, Japan

[21] Appl. No.: 53,506

[22] Filed: Jun. 28, 1979

[30] Foreign Application Priority Data

Jul. 3, 1978 [JP] Japan .................. 53/91624[U]

[51] Int. Cl.³ ............................................ G11B 15/60
[52] U.S. Cl. .................................................... 360/96.5
[58] Field of Search .............................. 360/96.5, 132

[56] References Cited

U.S. PATENT DOCUMENTS 3,864,744 2/1975 Uemura ............................. 360/96.5
4,060,838 11/1977 Meermans ......................... 360/96.5

FOREIGN PATENT DOCUMENTS 5313372 5/1980 Japan .

Primary Examiner—Robert S. Tupper
Attorney, Agent, or Firm—Toren, McGeady & Stanger

[57] ABSTRACT

A superminiature cassette tape recorder is disclosed. The tape recorder comprises a capstan hole, a cassette positioning hole and a capstan bearing external portion forming a criterion for positioning a cassette.

1 Claim, 3 Drawing Figures

SUPERMINIATURE CASSETTE TAPE RECORDER

BACKGROUND OF THE INVENTION

The present invention relates to a superminiature cassette tape recorder which is positively positioned and used.

In these days, a microcassette (trade name) used for a superminiature tape recorder is provided with a capstan hole at its center and capstan holes on both sides thereof.

The capstan holes on both sides are provided for the purpose of miniaturization and used together with a standard surface for positioning a cassette during insertion thereof.

The cassette is, therefore guided to a predetermined position when inserting the cassette.

Japanese Utility Model Application Publication No. 13,372/78 discloses a prior technique in the art whereby a cassette is set at a predetermined position by providing a standard surface in a capstan bearing, but its construction is complicated and its operation is troublesome. Particularly, there is a small gap between the capstan inserting hole and the radial bearing portion so that it is difficult to insert a cassette thereinto, and the cassette must be inserted from almost directly above.

SUMMARY OF THE INVENTION

An object of the present invention is to eliminate the above disadvantages of the conventional tape recorder.

Another object of the present invention is to provide a superminiature cassette tape recorder which is simple in construction, capable of smooth insertion and easy to manufacture.

According to the present invention a superminiature cassette for use with a tape recorder comprises in command a capstan hole and a cassette positioning hole with a capstan bearing of the recorder external portion formed on a capstan bearing forming a criterion for positioning the cassette, whereby the cassette is mounted on the capstan bearing external portion by guiding the cassette with the use of an opening front wall surface of the cassette. The positioning criterion of the cassette is provided by one operating as the capstan hole and a cassette positioning hole.

DESCRIPTION OF THE PREFERRED EMBODIMENT

Figure 1:
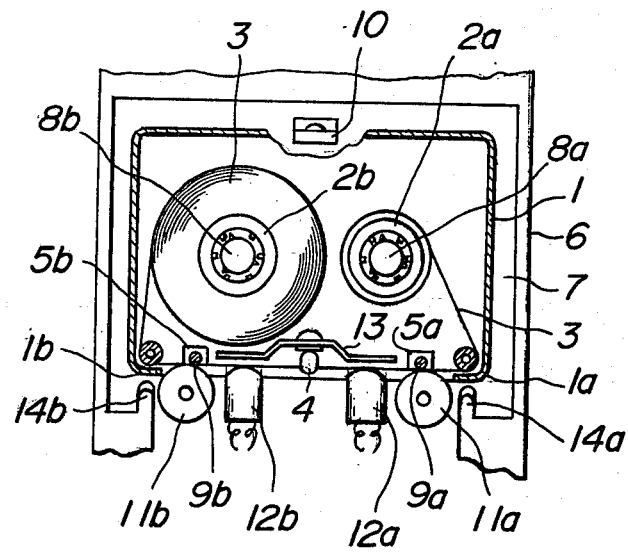
FIG. 1 is a partially cutaway plan view of a cassette to be inserted.

Referring now to FIG. 1 one embodiment of a tape recorder according to the present invention will be described. In FIG. 1, in a tape cassette 1 is housed a magnetic tape 3 engaged with a pair of reel hubs 2a, 2b at both ends, and the tape 3 is moved along an opening front surface of the cassette 1.

The opening front surface of the cassette 1 is provided with five openings, and at the center of one opening is formed a capstan inserting hole 4 and on both sides of this opening are formed a pair of capstan inserting holes 5a, 5b extending through the cassette.

In a cassette inserting chamber 7 of a tape recorder body 6 there are arranged a pair of reel shafts 8a, 8b, a pair of capstan shafts 9a, 9b and a cassette pressing spring 10.

At the front opening of the cassette 1 there are arranged a pair of pinch rollers 11a, 11b and magnetic heads 12a, 12b to be inserted into the cassette 1.

In addition, the magnetic heads 12a, 12b are arranged with a tape pad 13 for pressing the tape 3 into the cassette 1.

In the above manner, the cassette 1 is inserted in a tape recorder of a dual capstan type. The present invention is, as shown in FIGS. 2 and 3, further provided with a pair of cassette guide projection walls 14a, 14b adjacent to the pinch rollers 11a, 11b of the cassette inserting chamber 7 and a cassette positioning capstan bearing 15 formed by the capstan shafts 9a, 9b.

Figures 2, 3:
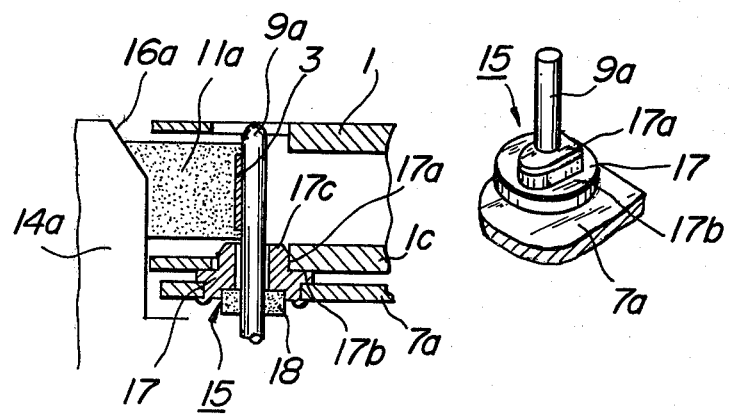
FIG. 2 is an enlarged cross-sectional view showing the essential part of the tape recorder according to the present invention.
FIG. 3 is a perspective view of the essential part shown in FIG. 2.

The guide projection walls 14a, 14b are, as shown in FIG. 2, provided with inclined portions 16a, 16b at the upper portion, and as the cassette 1 is inserted into the cassette inserting chamber 7 the inclined portions 16a, 16b are brought into contact with the end portions of the front surface external walls 1a, 1b of the cassette 1.

The capstan shaft 9a is further provided with a cassette positioning external portion 17 fixed to a base plate 7a and a capstan bearing 18 thereunder, and a positioning portion 17a to be inserted into the cassette 1 of the external portion 17 is formed into the same shape as the capstan inserting hole 5a and with a flat portion. The other capstan shaft 9b is also formed in the same manner.

Therefore, the cassette 1 is formed to bring the flat portion of the capstan inserting hole 5a into contact with the flat portion of the external portion 17 and the lower case 1c of the cassette 1 into contact with the cassette receiving portion 17b of the external portion 17. The external portion 17 has a bevelled portion 17c for facilitate insertion of the cassette 1.

When the cassette 1 is inserted into the tape recorder, the base surface side of the cassette 1 is downwardly inclined and inserted into the cassette inserting chamber 7 and the opening side of the cassette 1 is pushed down, and then the front external walls 1a, 1b of the cassette 1 are brought into contact with the cassette guide projections 14a, 14b and the cassette 1 is pushed down along the projections 14a, 14b by pressing the leaf spring 10.

When the lower side of the cassette 1 reaches the base plate 7a, the guide projections 14a, 14b are separated from the cassette 1, but the capstan inserting holes 5a, 5b are positioned at the bevelled portion of the cassette positioning external portion 17, so that the external portion 17 is easily inserted into the cassette 1 by further pressing the cassette 1.

Thus, the flat positioning portion 17a of the external portion 17 and the flat portion of the capstan inserting holes 5a, 5b are closely brought into contact with each other by pressing of the leaf spring 10 and the positioning of the cassette may be precisely effected.

The inserted cassette has a slight gap between its front portion and the guide projection, so that the positioning of the cassette is determined between the cassette and the capstan shaft external portion, and its positioning is determined by inclining the cassette and pressing it down along the cassette guide projection with a very simple operation.

Further, the positioning external portion is very simple in construction, high in precision, easy in assemblying and low in cost.

The present invention is not limited to the above embodiment but the configuration of the external portion can optionally be modified. Further, the cassette guide projection can be a single body or variously modified.

As stated above, according to the present invention, the cassette inserting chamber is formed with a cassette guide projection and the bearing portion of the capstan shaft is provided with a positioning external portion, so that a superminiature tape recorder for easy operation and precise positioning can be proposed with a simple construction.

What is claimed is:

1. In a combination of a microcassette and player, said microcassette having on one side thereof a pair of spaced apart capstan holes for engaging a pair of equivalently spaced capstan shafts provided in said player for operatively positioning said microcassette within said player, said player including a pair of capstan shafts for engaging within said holes, the improvement comprising that said player is formed to include bearings for each of said capstan shafts and a cassette positioning external portion located to extend around each of said capstan shafts and structured separately from said bearings located immediately above said bearings, each of said cassette positioning external portions surrounding said capstan shafts and being arranged to engage within the same hole as each of said capstan shafts for positioning said cassette in said player so that use is made of a common hole in said cassette as a capstan engaging hole and as a cassette positioning hole, with the contour of said cassette positioning external portion operating as a positioning reference for said cassette, each of said cassette positioning external portions being dimensioned to extend only for a limited distance along the length of said capstan shaft sufficient to engage with said holes in said cassette to establish appropriate positioning thereof relative to said player, said player including guide wall means engaging against external wall means of said cassette to guide said cassette during insertion thereof into said player to bring said cassette positioning external portions into engagement with each of said capstan holes for positioning said cassette, said cassette positioning external portions each being formed to include a generally cylindrical wall sized to engage within a portion of said capstan hole defined by an outer wall of said cassette, a flange portion extending to define an abutment surface adapted to be engaged by said outer wall of said cassette when said cassette is fully inserted into said player and a beveled portion arranged to guide said capstan hole into position about said cylindrical portion and to facilitate insertion of said cassette positioning external portion into said capstan hole.

* * * * *